(12) United States Patent
Nielson et al.

(10) Patent No.: US 7,625,129 B2
(45) Date of Patent: Dec. 1, 2009

(54) RUGGED EXPANDED BEAM CONNECTOR

(75) Inventors: Jeffrey D. Nielson, Wylie, TX (US); Matthew Cruz, Council Buffs, IA (US)

(73) Assignee: Commscope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 11/765,337

(22) Filed: Jun. 19, 2007

(65) Prior Publication Data

US 2007/0292096 A1  Dec. 20, 2007

Related U.S. Application Data

(60) Provisional application No. 60/814,527, filed on Jun. 19, 2006.

(51) Int. Cl.
  *G02B 6/36* (2006.01)
  *G02B 6/38* (2006.01)

(52) U.S. Cl. ............................. 385/79; 385/35; 385/39; 385/50; 385/60; 385/70; 385/71; 385/72; 385/73; 385/74; 385/78; 385/83

(58) Field of Classification Search .................. 385/33, 385/35, 39, 50, 53, 60, 70–74, 76–79, 83, 385/138
See application file for complete search history.

(56) References Cited

U.S. PATENT DOCUMENTS

| | | | |
|---|---|---|---|
| 4,461,537 A * | 7/1984 | Raymer et al. ................. 385/88 |
| 5,076,656 A * | 12/1991 | Briggs et al. .................. 385/71 |
| 5,080,461 A | 1/1992 | Pimpinella | |
| 5,123,073 A | 6/1992 | Pimpinella | |
| 5,257,332 A | 10/1993 | Pimpinella | |
| 5,542,013 A | 7/1996 | Kaplow et al. | |
| 2005/0036735 A1* | 2/2005 | Oosterhuis et al. ............ 385/26 |

\* cited by examiner

*Primary Examiner*—Frank G Font
*Assistant Examiner*—Michael P Mooney
(74) *Attorney, Agent, or Firm*—Muncy, Geissler, Olds & Lowe, PLLC (57) ABSTRACT

A multi channel connector includes a first connector housing and a mating second connector housing. The first connector housing includes a plurality of first termini, each first terminus resting upon a respective bench or within a respective channel. The second connector housing loosely holds a plurality of second termini. In a first embodiment, a biasing member is disposed in the first connector housing and when the first and second housings are mated, the biasing member engages the plurality of second termini to press the second termini onto engagement with respective benches within the first housing to thereby ensure accurate end-to-end alignments between the plurality of first termini and the plurality of second termini. In a second embodiment, chamfers are formed at openings to the respective channels and beveled outer edges are formed at tip ends of the second termini to guide the second termini into respective channels, when the first and second connector housings are mated. The channels diminish to tight tolerances to bring the second termini into end-to-end alignment with the first termini.

19 Claims, 7 Drawing Sheets

RUGGED EXPANDED BEAM CONNECTOR

This application claims the benefit of U.S. Provisional Application No. 60/814,527, filed Jun. 19, 2006, the entire contents of which are herein incorporated by reference.

BACKGROUND OF THE INVENTION

1. Field of the Invention

The present invention relates to fiber optic connectors. More particularly, the present invention relates to a multi-channel connector of robust design, which can be easily fabricated and repaired and which has improved tolerances.

2. Description of the Related Art

Multi-channel fiber optic connectors are known in the background art. For example, in an eight channel connector of the background art, one housing would hold eight ferrules terminating eight optical fibers. When the connector housing mated with a complimentary housing (e.g. on a back plane), eight ferrules held by the complimentary housing would need to precisely align with the eight ferrules of the connector housing.

It is understood in the background art, that the ferrules of the connector housing must be precisely aligned with the ferrules of the complimentary housing or signal attenuation will occur in the channels of the misaligned ferrules. Therefore, it was an obvious design parameter in the background art to make the ferrule to connector housing attachments extremely fixed and precisely located. Any slight deviation of a ferrule from its intended position within the connector housing led to poor performance of the channel of the multi-channel connector.

SUMMARY OF THE INVENTION

Applicants have appreciated drawbacks in the multi-channel connectors of the background art.

It is expensive and difficult to manufacture multi-channel connectors in accordance with the background art due to the precise tolerances required between adjoining connector halves. Because of the required close tolerances, the failure rate of tested new multi-channel connectors can be high. During manufacture, if one channel of a multi-channel connector fails, the entire multi-channel connector is considered a failure and scrapped.

Also, Applicants have appreciated that in field use, whenever one or more channels of a multi-channel connector fails, the technician replaces the entire multi-channel connector. This is time consuming and wasteful.

It is an object of the present invention to address one or more of the drawbacks of the background art.

It is an object of the present invention to provide a multi-channel connector, which is easier and/or less expensive to build.

It is an object of the present invention to provide a multi-channel connector, which can have slight fluctuations in the ferrule placement within the connector housing, yet exhibit better alignment between the set of ferrules in the connector housing and the set of ferrules in the complementary housing, as compared to the background art.

These and other objects are accomplished by a multi channel connector including a first connector housing and a mating second connector housing. The first connector housing includes a plurality of first termini, each first terminus resting upon a respective bench or within a respective channel. The second connector housing loosely holds a plurality of second termini. In a first embodiment, a biasing member is disposed in the first connector housing and when the first and second housings are mated, the biasing member engages the plurality of second termini to press the second termini onto engagement with respective benches within the first housing to thereby ensure accurate end-to-end alignments between the plurality of first termini and the plurality of second termini. In a second embodiment, chamfers are formed at openings to the respective channels and beveled outer edges are formed at tip ends of the second termini to guide the second termini into respective channels, when the first and second connector housings are mated. The channels diminish to tight tolerances to bring the second termini into end-to-end alignment with the first termini.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein;

rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
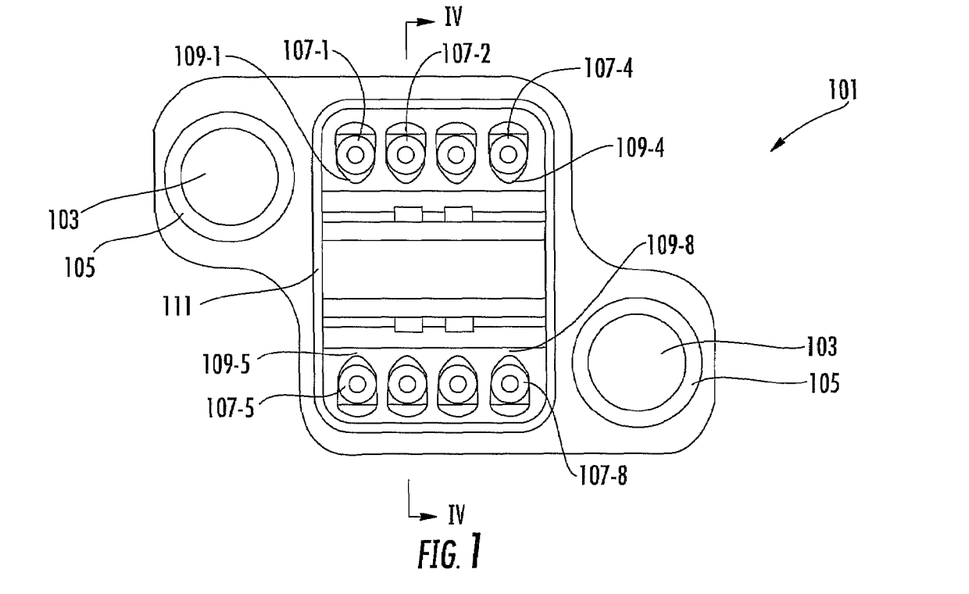
FIG. 1 is a connection-side end view of a first half of a connector, in accordance with a first embodiment of the present invention.

FIG. 1 is a connection-side end view of a first half 101 of the connector in accordance with a first embodiment of the present invention. The first half 101 includes two coarse alignment sleeves 103. Each course alignment sleeve 103 has a conical chamfer 105 at its opening.

Eight first termini 107-1 through 107-8 extend in parallel with the alignment sleeves 103. Each of the first termini 107-1 through 107-8 is attached to a first housing 111 and rests on a respective bench 109-1 through 109-8 within the housing 111, as will be described in more detail in relation to Figures hereinafter.

Figure 2:
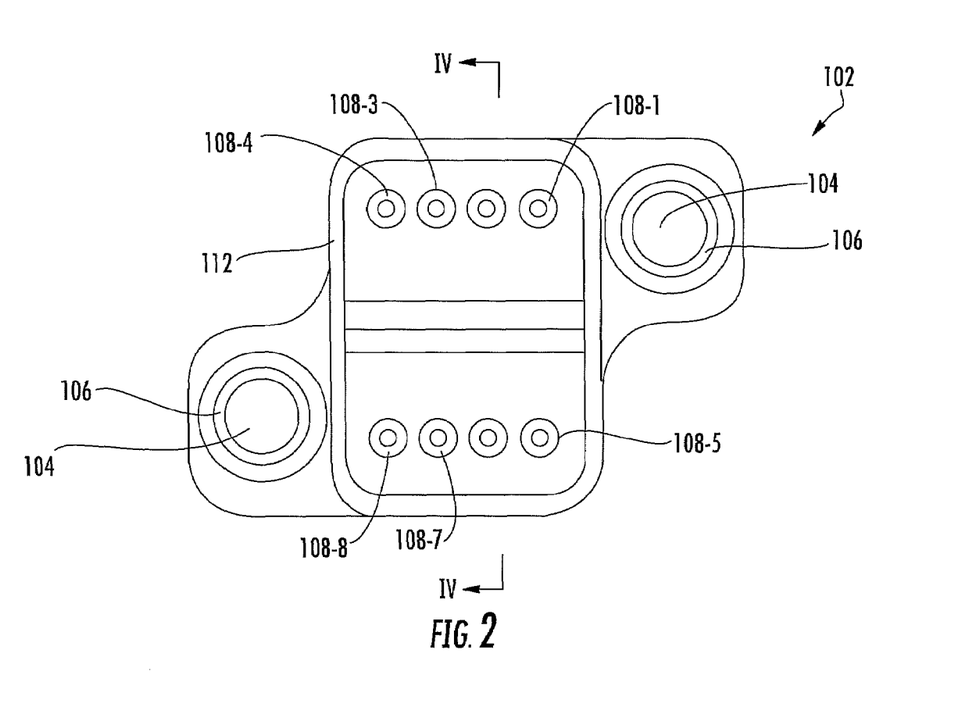
FIG. 2 is a connection-side end view of a second half of the connector, in accordance with the first embodiment of the present invention.
Figure 3:
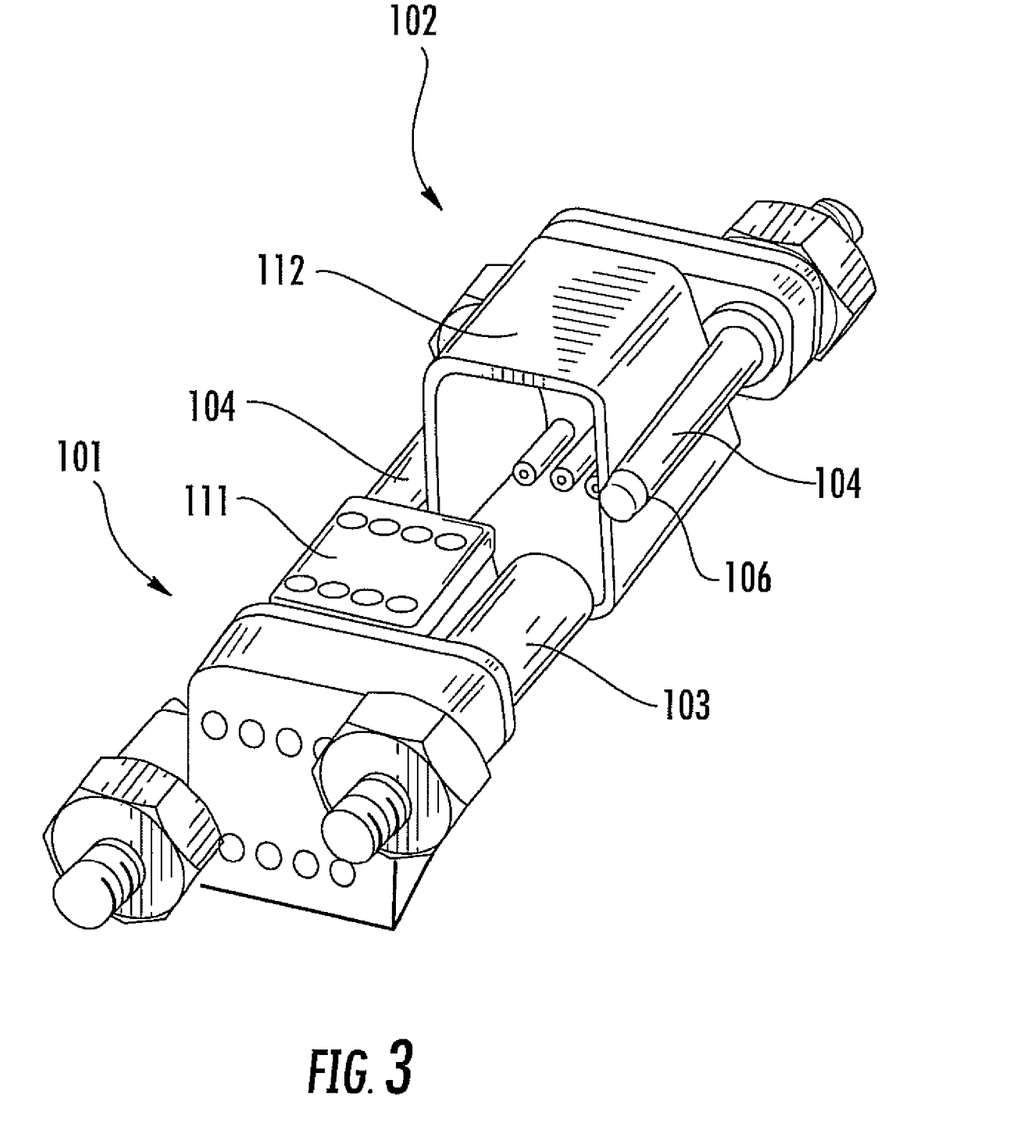
FIG. 3 is a perspective view of the first and second halves of the connector of FIGS. 1 and 2 just prior to mating.

FIG. 2 is a connection-side end view of a second half 102 of the connector in accordance with the present invention. The second half 102 includes two coarse alignment pins 104. Each course alignment pin 104 has a chamfer or beveled outer edge 106 at its end. Each pin 104 is sized to be closely received into a respective sleeve 103. The beveled outer edge 106 operates in conjunction with the conical chamfer 105 to assist in the proper alignment of the two connector halves 101 and 102. FIG. 3 is a perspective view which illustrates the matting of the two connector halves 101 and 102.

In the second half 102 of the connector, eight second termini 108-1 through 108-8 extend in parallel with the alignment pins 104 and are attached to a second housing 112 at the rear ends thereof. Each of mid-portions of the second termini 108-1 through 108-8 resides in free space within the second housing 112 of the second half 102 of the connector, i.e. the second termini 108-1 through 108-8 do not rest on respective benches of the second housing 112 as do the first termini 107-1 through 107-8. Further, the second termini 108-1 through 108-8 may have a loose connection to the second housing 112.

Figure 4:
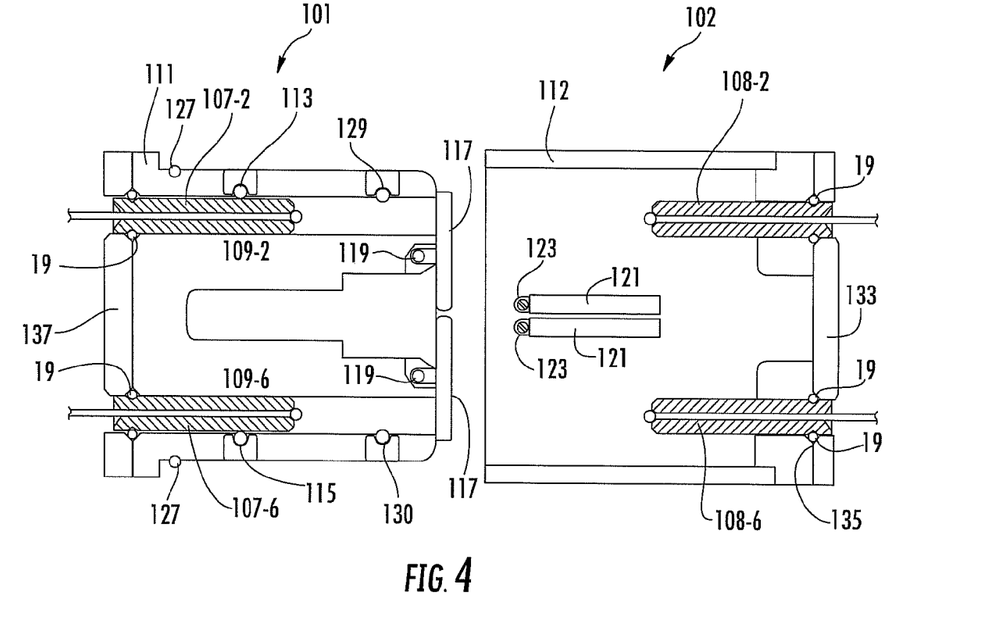
FIG. 4 is a cross sectional side view taken along lines IV-IV in FIGS. 1 and 2 when the two halves of the connector are separated and aligned for mating.

FIG. 3 is a perspective view of the first and second halves 101 and 102 of the connector in alignment for mating and just prior to mating. FIG. 4 is a cross sectional view taken along line IV-IV of FIGS. 1 and 2. FIG. 4 also shows the first and second halves 101 and 102 of the connector in alignment just prior to mating. In FIG. 4, one can see that the first termini 107-1 through 107-8 and the second termini 108-1 through 108-8 are constructed the same and that they may be formed as cylindrical ceramic ferrules presenting an end of an optical fiber or a lens at one end thereof. More preferably, the termini 107-1 through 107-8 and 108-1 through 108-8 are constructed in accordance with the inventive termini described in Applicants' co-pending application entitled "Expanded Beam Connector Concepts," filed on even date herewith, the contents of which are herein incorporated by reference. More specifically, the termini include a lens at the distal end and retaining features around an outer circumference to assist in attaching the termini to a respective one of the first or second housings 111 or 112. Although the inventive termini of Applicants' co-pending application are preferred in the present invention (especially the embodiment of FIG. 5B in the co-pending application), the present invention would still enjoy many inventive advantages even if the inventive termini of Applicants' co-pending application were not employed herein.

FIG. 4 shows the second terminus 107-2 resting on the second bench 109-2. The second bench 109-2 may be a corrosion resistant metal, ceramic, composite or silicon bench with a v-groove for the second terminus 107-2. The second terminus 107-2 is firmly seated into the v-groove of the second bench 109-2 by a spring 113. The spring 113 is a linear resilient wire, which is held by the first housing 111. The resilient wire presses against a side of the second terminus 107-2 and biases the second terminus 107-2 against the second bench 109-2.

Likewise, FIG. 4 shows the sixth terminus 107-6 resting on the sixth bench 109-6. The sixth bench 109-6 would also include a v-groove. A spring 115 presses against a side of the sixth terminus 107-6 and biases the sixth terminus 107-6 against the sixth bench 109-6.

FIG. 4 illustrates first doors 117 on the first half 101 of the connector. The first doors 117 are illustrated in a closed position and pivot about hinges 119. The first doors 117 are normally biased to the closed position by a spring in order to prevent dust and debris from entering the housing 111 when the two halves of the connector are not mated.

FIG. 4 also illustrates second doors 121 on the second half 102 of the connector. The second doors 121 are illustrated in an opened position and pivot about hinges 123. The second doors 121 are normally biased to a closed position by a spring in order to prevent dust and debris from entering the housing 112 when the two halves 101 and 102 of the connector are not mated; however for illustration purposes the second doors 121 have been shown in the open position.

Figure 6:
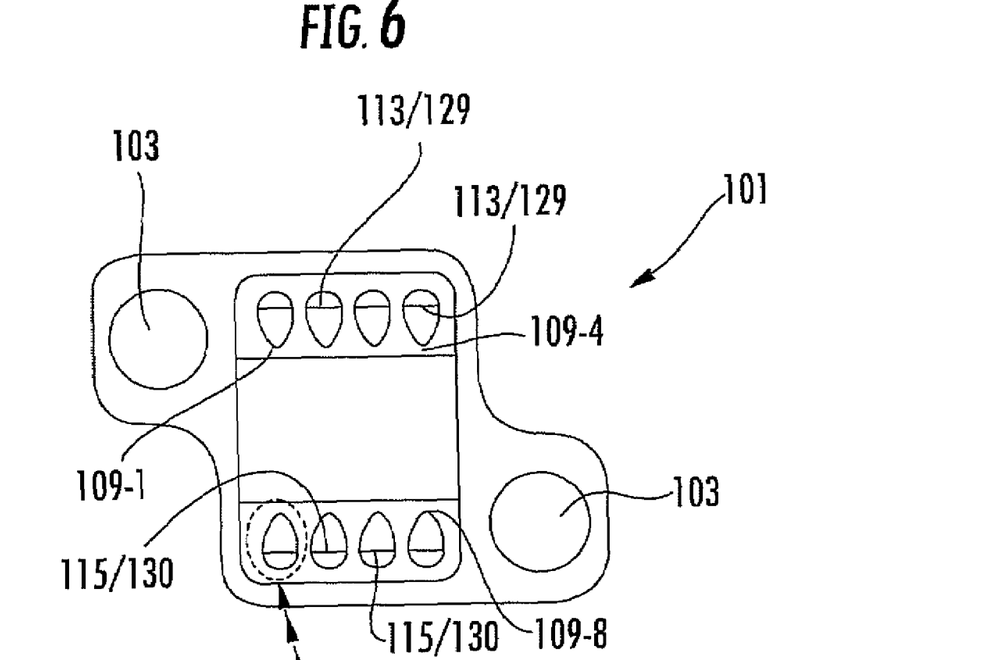
FIG. 6 is a view similar to FIG. 1, but with first doors and termini removed to better illustrate several benches.
Figure 6A:
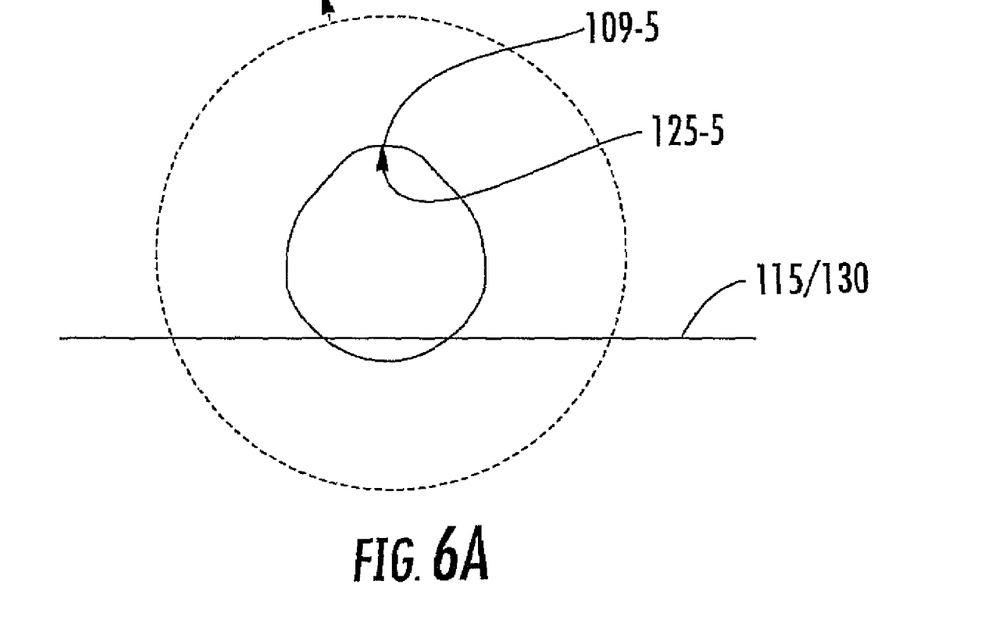
FIG. 6A is a close-up view of a portion of FIG. 6.

FIG. 6 is a view similar to FIG. 1, but with the first doors 117 and the termini 107-1 through 107-8 removed to better illustrate the benches 109-1 through 109-8. FIG. 6A is an enlarged view of a portion of FIG. 6. FIG. 6A illustrates the shape of the fifth bench 109-5. The remaining benches in the first half 101 of the connector would be similarly shaped. As seen in FIGS. 6 and 6A, the surface against which the fifth terminus 107-5 is brought to bear is somewhat v-shaped, with flat sides connected by small radius at the top and a larger radius at the bottom, presenting an overall egg shape. The fifth terminus 107-5 would be pressed against the trough 125-5 of the fifth bench 109-5 by the spring 115.

Figure 5:
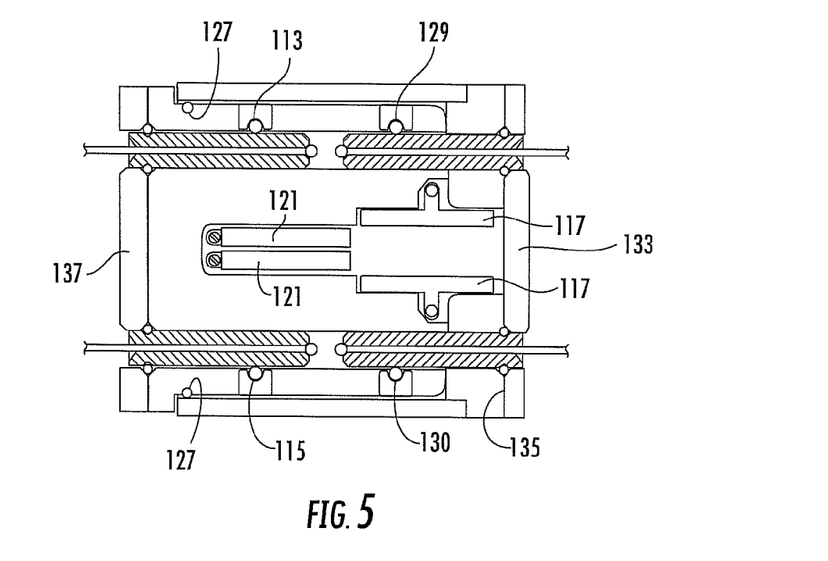
FIG. 5 is a cross sectional side view showing the two halves of the connector in FIG. 4 in a mating condition.

FIG. 5 illustrates the mating of the first and second halves 101 and 102 of the connector. One feature to note is the opening of the first and second doors 117 and 121. The first and second doors 117 and 121 have pivoted about their respective hinges 119 and 123. The doors 117 and 121 have a biasing force applied thereto, such as by respective springs wound about the hinges 119 and 123. The biasing force tends to close the doors 117 and 121, such that the doors 117 and 121 automatically close when the connector halves are unmated. Alternatively, a tethered cap may be attached to each half 101 and 102 of the connector.

Another feature to note in FIG. 5 is the sealing nature of the two housings 111 and 112. The first housing 111 includes an O-ring 127, which forms a seal when the first and second halves 101 and 102 of the connector are mated. The O-ring 127 prevents dust and debris from entering the termini area within the housings 111 and 112.

Another feature to note in FIG. 5 is the removable nature of the termini 107 and 108. A back plate 133 is connected to a back side 135 of the housing 112. The back plate 133 captures retainer rings 19 of the termini 108 into recessed areas formed in the back side 135 of the housing 112. Loosening the back plate 133 will loosen the termini 108, and allow a technician to remove an individual terminus. This provides for individual replace of the terminus and hence repair of the multichannel connector.

The first half 101 of the connector would also have a removable back plate 137 to loosen the termini 107. The back plates 133 and 137 could be attached to the backsides via the alignment sleeves 103 and pins 104. Alternatively, they could be attached by separate fixing means, such as screws.

Another important feature to note in FIG. 5 is the alignment features of the first and second sets of termini 107 and 108. As the second termini 108 approach the first termini 107, the second termini 108 are engaged by springs 129 and 130. The springs 129 and 130 press the second termini 108 into respective v-grooves of the benches 109. Hence, since a first terminus 107-X and a corresponding second terminus 108-X are pressed against a common v-groove in a common bench 109-X, extremely accurate alignment will occur. So long as the surface of the bench 109-X is straight (e.g. the surfaces of the v-groove are flat), the first ferrule 107-X will be properly aligned with the second ferrule 108-X.

This last aspect is a remarkable improvement over the background art. In the background art, it was imperative to have precise and very rigid positioning of the ferrules in the mating connector. In the present invention, the springs in one part of the mating connector can be used to slightly move the ferrules in the other part of the mating connector to achieve proper alignment when mating occurs. Therefore, the ferrules in the mating connector can have slight play in their attachments and extremely precise relative positioning with the mating connector is not required. Hence, the connector is easier to manufacturer and can be manufactured at a lower cost with fewer failures due to tolerance imperfections.

FIGS. 7-11 illustrate a second embodiment of the present invention which also permits the ferrules in the mating connector to have slight play in their attachments. The second embodiment does not require the springs or any other type of biasing member, yet retains the advantageous benefits of a connector which is easier to manufacturer and can be manufactured at a lower cost with fewer failures due to tolerance imperfections.

Figure 8:
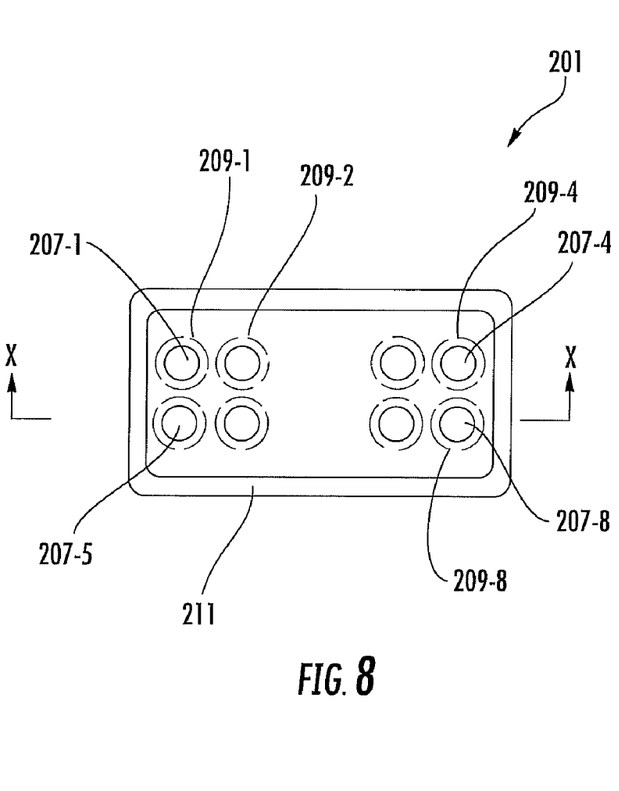
FIG. 8 is a connection-side end view of a first half of the connector, in accordance with the second embodiment of the present invention.

FIG. 8 is a connection-side end view of a first half 201 of the connector in accordance with a second embodiment of the present invention. Eight first termini 207-1 through 207-8 extend parallel to each other. Each of the first termini 207-1 through 207-8 is attached to a first housing 211 and resides within a respective channel 209-1 through 209-8 within the housing 111, as will be described in more detail in relation to Figures hereinafter.

Figure 7:
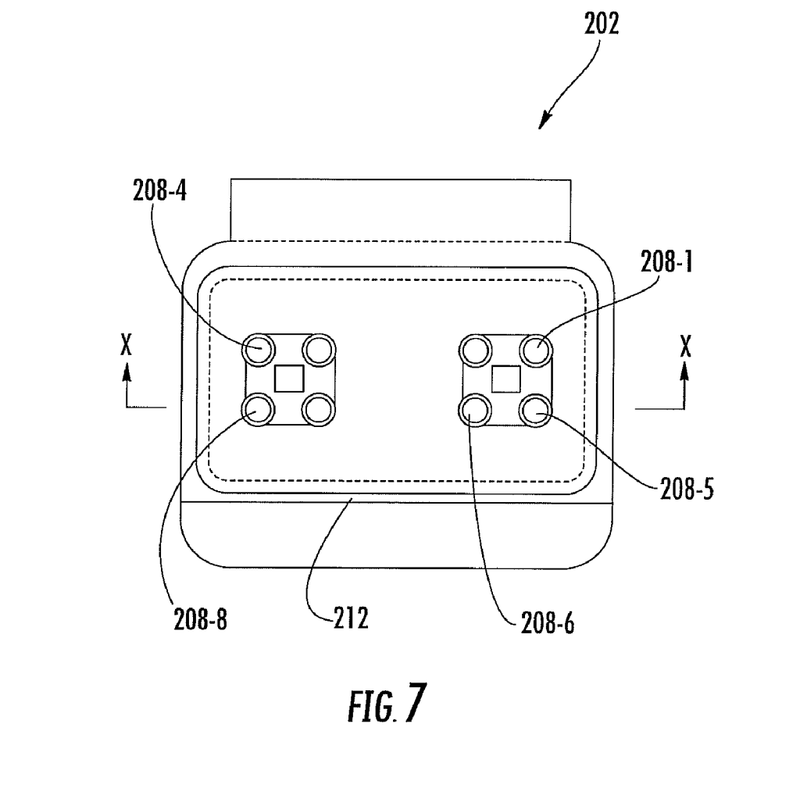
FIG. 7 is a connection-side end view of a second half of a connector, in accordance with a second embodiment of the present invention.

FIG. 7 is a connection-side end view of a second half 202 of the connector in accordance with the second embodiment of the present invention. In the second half 202 of the connector, eight second termini 208-1 through 208-8 extend in parallel to each other and are loosely attached to a second housing 212 at the rear ends thereof. The term "loosely" means that the attachment is not completely rigid, and the second termini 208-1 through 208-8 might perhaps rattle if the second housing 212 were shook. Each of mid-portions of the second termini 208-1 through 208-8 resides in free space within the second housing 212 of the second half 202 of the connector, i.e. the second termini 208-1 through 208-8 do not reside within channels of the second housing 212 as do the first termini 207-1 through 207-8 within the first housing 211. Of course, the first and/or second housings 211 and 212 could include doors similar to the embodiment of FIGS. 1-5; however, such doors have been removed from the FIGS. 7-11 for clarity.

Figure 9:
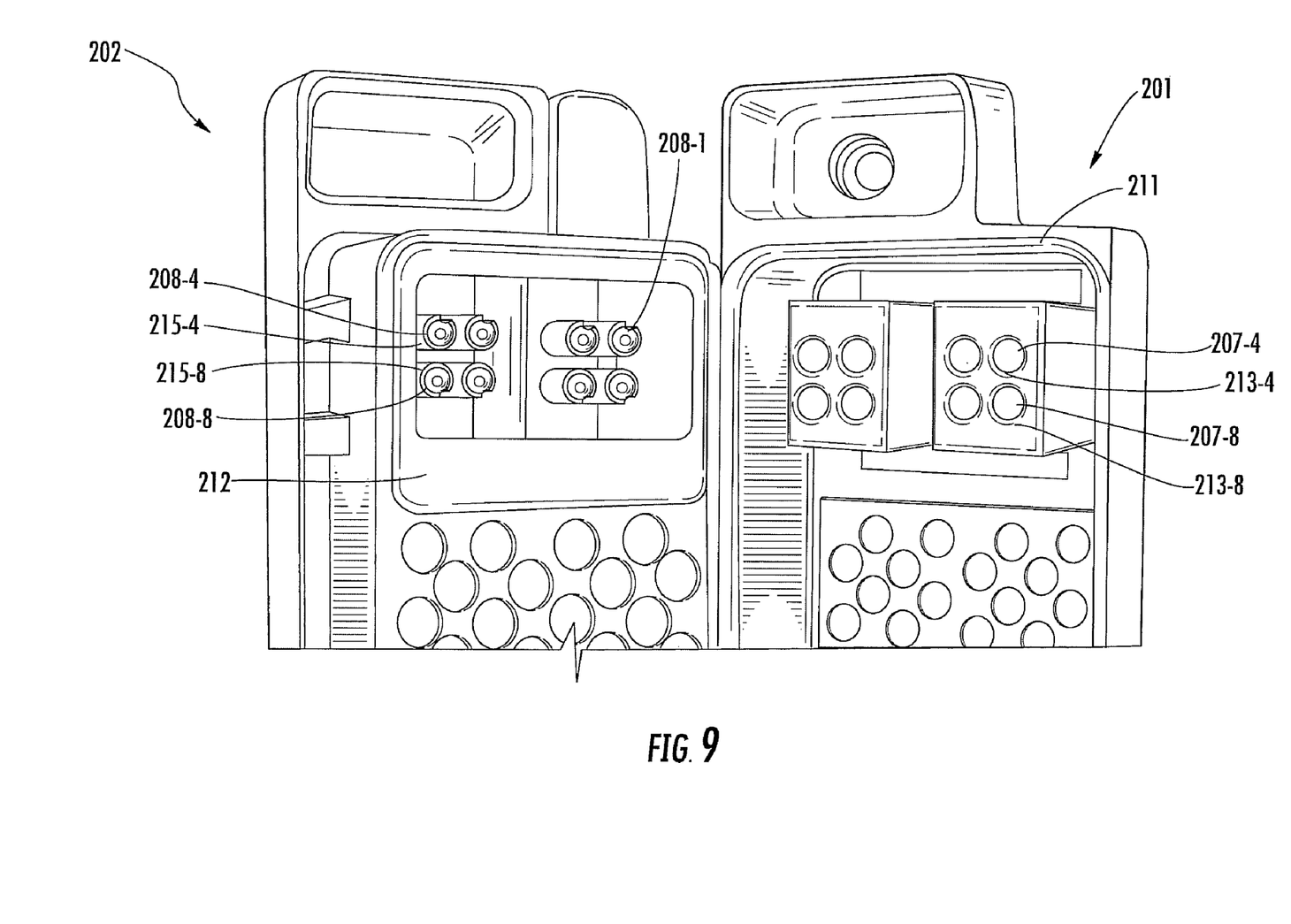
FIG. 9 is a perspective view of the first and second halves of the connector of FIGS. 8 and 7 just prior to mating.
Figure 10:
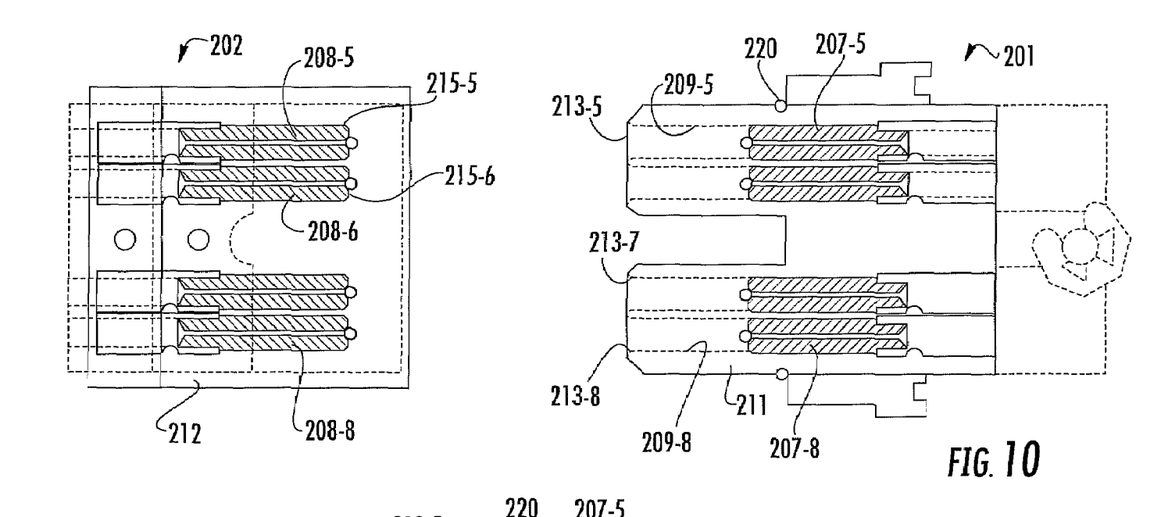
FIG. 10 is a cross sectional side view taken along lines X-X in FIGS. 7 and 8 when the two halves of the connector are separated and aligned for mating.

FIG. 9 is a perspective view of the first and second halves 201 and 202 of the connector in alignment for mating and just prior to mating. FIG. 10 is a cross sectional view taken along line X-X of FIGS. 7 and 8. FIG. 10 also shows the first and second halves 201 and 202 of the connector in alignment just prior to mating. The connector of FIGS. 7-11 uses chamfers at the leading edge of the first housing 211 to engage the robust inner wall of the second housing 212 to initiate connector alignment. The minimal clearance between the first housing 211 and the second housing 212 guides the housings into close alignment as the connectors engage, similar to the alignment pin 104 and sleeve 103 used in the connector of FIGS. 1-6.

In FIG. 10, one can see that the first termini 207-1 through 207-8 and the second termini 208-1 through 208-8 are constructed the same and that they may be formed as cylindrical ceramic ferrules presenting an end of an optical fiber or a lens at one end thereof. More preferably, the termini 207-1 through 207-8 and 208-1 through 208-8 are constructed in accordance with the inventive termini described in Applicants' co-pending application entitled "Expanded Beam Connector Concepts," filed on even date herewith, the contents of which are herein incorporated by reference. More specifically, the termini include a lens at the distal end and retaining features around an outer circumference to assist in attaching the termini to a respective one of the first or second housings 211 or 212. Although the inventive termini of Applicants' co-pending application are preferred in the present invention (especially the embodiment of FIG. 5B in the co-pending application), the present invention would still enjoy many inventive advantages even if the inventive termini of Applicants' co-pending application were not employed herein.

FIG. 10 shows the fifth terminus 207-5 residing within the fifth channel 209-5 of the first half 201 of the connector. The fifth channel 209-5 has a cylindrical shape with a tight tolerance and precisely fits the outer contours of the fifth terminus 207-5. The fifth terminus 207-5 is closely received within the fifth channel 209-5. An opening to the fifth channel 209-5 includes a chamfer 213-5, as do each of the openings to the respective first through eighth channels 209-1 through 209-8.

A tip end of the corresponding fifth terminus 208-5 of the second half 202 of the connector includes a beveled outer edge 215-5, as do each of the tip ends of the respective first through eighth termini 208-1 through 208-8 within the second half 202 of the connector. During mating of the first and second halves 201 and 202 of the connector, the beveled outer edges 215-1 through 215-8 cooperate with respective ones of the chamfers 213-1 through 213-8 to guide the plurality of second termini 208-1 through 208-8 into respective channels 209-1 through 209-8. The channels 209-1 through 209-8 quickly diminish to tight tolerance cylindrical shapes, such that the loose second termini 208-1 through 208-8 are brought into accurate face-to-face (or lens-to-lens) alignment with the first termini 207-1 through 207-8 when the first and second halves 201 and 202 are mated. It is preferred that a slight gap exist between the faces (or lens) to prevent wear or damage in the case of vibration, as best seen in FIG. 11.

Figure 11:
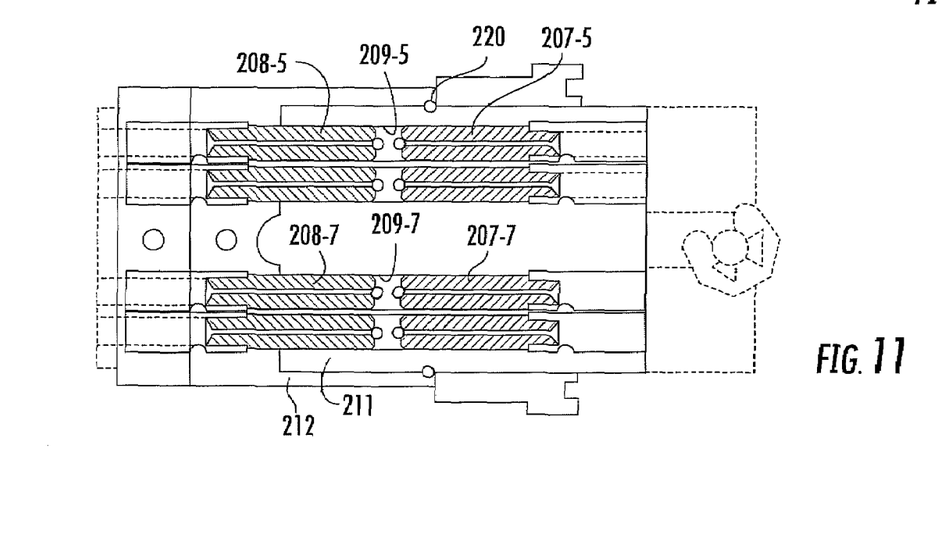
FIG. 11 is a cross sectional side view showing the two halves of the connector in FIG. 10 in a mating condition.

FIG. 11 illustrates the mating of the first and second halves 201 and 202 of the connector. The two housings 211 and 212 are in close intimate contact with each other to prevent dust and debris from entering the termini area within the housings 211 and 212. An O-ring 220 may optionally be provided, as was illustrated in FIGS. 4 and 5 if desired.

Another feature to note in FIG. 11 is the removable nature of the termini 207 and 208. As in FIGS. 4 and 5, back plates may be provided to capture retaining features of termini 207 and 208. Loosening a back plate will loosen the termini 207 or 208, and allow a technician to remove an individual terminus. This provides for individual replace of the terminus and hence repair of the multi-channel connector.

Again, an important feature to note in FIG. 11 is the alignment features of the first and second sets of termini 207 and 208. As the second termini 208 approach the first termini 207, the loosely mounted second termini 208 are guided (via the beveled edges 215 and/or chamfers 213) into precisely sized channels 209. The precise channels 209 provide for extremely accurate alignment of the ends of the first and second termini 207 and 208.

Again, this last aspect is a remarkable improvement over the background art. In the background art, it was imperative to have precise and very rigid positioning of the ferrules in the mating connector. In the present invention, guiding features can be used to slightly move the ferrules in the other part of the mating connector to achieve proper alignment when mating occurs. Therefore, the ferrules in the mating connector can have slight play in their attachments and extremely precise relative positioning within the mating connector is not required. Hence, the connector is easier to manufacturer and can be manufactured at a lower cost with fewer failures due to tolerance imperfections.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A fiber optic connector comprising:
   a first connector housing including a first terminus resting on a first bench;
   a mating, second connector housing including a second terminus; and
   a biasing member disposed in said first connector housing, wherein said biasing member engages said second terminus when said first and second connector housings are mated and presses said second terminus onto said first bench and into end-to-end alignment with said first terminus, wherein said second terminus is loosely connected to said second housing.

2. The fiber optic connector of claim 1, wherein said biasing member engages a side surface of said second terminus.

3. The fiber optic connector of claim 2, wherein said biasing member is a first spring wire disposed above said first bench.

4. The fiber optic connector of claim 3, further comprising:
   a second spring wire disposed above said bench, wherein said second spring wire engages a side surface of said first terminus to press said first terminus onto said first bench and into end-to-end alignment with said second terminus when said first and second connector housings are mated.

5. A fiber optic connector comprising:
   a first connector housing including a first terminus resting on a first bench;
   a mating, second connector housing including a second terminus; and
   a biasing member disposed in said first connector housing, wherein said biasing member engages said second terminus when said first and second connector housings are mated and presses said second terminus onto said first bench and into end-to-end alignment with said first terminus, wherein said first bench includes a v-groove and said first terminus and said second terminus reside in said v-groove when said first and second connector housings are mated.

6. The fiber optic connector of claim 1, wherein said first housing includes a plurality of said first termini and a plurality of said first benches, each first terminus respectively resting on one first bench of said plurality of first benches, and wherein said second housing includes a plurality of said second termini.

7. The fiber optic connector of claim 6, wherein said biasing member is disposed above said plurality of said first benches, and wherein said biasing member engages said plurality of said second termini when said first and second connector housings are mated and presses each second terminus of said plurality of said second termini onto a respective first bench of said plurality of first benches and into end-to-end alignment with one first terminus of said plurality of first termini.

8. A fiber optic connector comprising:
a first connector housing including a first terminus resting on a first bench;
a mating, second connector housing including a second terminus; and
a biasing member disposed in said first connector housing, wherein said biasing member engages said second terminus when said first and second connector housings are mated and presses said second terminus onto said first bench and into end-to-end alignment with said first terminus, wherein said first terminus is a generally cylindrical first ferrule.

9. The fiber optic connector of claim 8, wherein said first ferrule includes a first optical fiber extending therethrough arid connected to a first lens disposed at an end of said first ferrule.

10. The fiber optic connector of claim 9, wherein said second terminus is a generally cylindrical second ferrule, wherein said second ferrule includes a second optical fiber extending therethrough and connected to a second lens disposed at an end of said second ferrule, and wherein said first and second lens are brought into face-to-face alignment with a gap therebetween when said first and second connector housings are mated.

11. The fiber optic connector of claim 1, further comprising:
at least one door attached to said first connector housing, wherein said at least one door blocks access to an interior of said first connector housing when said first and second connector housings are not mated, and allows access to the interior of said first connector housing when said first and second connector housings are mated.

12. A fiber optic connector comprising:
a first connector housing having a first terminus attached thereto, wherein said first terminus resides within a first channel of said first connector housing;
a mating, second connector housing including a second terminus, wherein said second terminus is loosely connected to said second connector housing; and
guidance structure disposed on at least an opening to said first channel or a tip end of said second terminus, wherein said guidance structure guides said second terminus into said first channel when said first and second connector housings are mated, and wherein said first channel has tight tolerances to bring said second terminus into end-to-end alignment with said first terminus, wherein said first terminus includes a first optical fiber extending therethrough and connected to a first lens disposed at an end of said first terminus.

13. The fiber optic connector of claim 12, wherein said guidance structure includes a beveled outer edge formed at said tip end of said second terminus.

14. The fiber optic connector of claim 12, wherein said guidance structure includes a chamfer formed at said opening to said first channel.

15. The fiber optic connector of claim 12, wherein said guidance structure includes a chamfer formed at said opening to said first channel and a beveled outer edge formed at said tip end of said second terminus.

16. The fiber optic connector of claim 12, wherein said first terminus is a generally cylindrical first ferrule.

17. The fiber optic connector of claim 16, wherein said second terminus is a generally cylindrical second ferrule, wherein said second ferrule includes a second optical fiber extending therethrough and connected to a second lens disposed at an end of said second ferrule, and wherein said first and second lens are brought into face-to-face alignment with a gap therebetween when said first and second connector housings are mated.

18. The fiber optic connector of claim 12, wherein said first connector housing includes a plurality of said first termini and a plurality of said first channels, each first terminus respectively residing within one first channel of said plurality of first channels, and wherein said second connector housing includes a plurality of said second termini.

19. The fiber optic connector of claim 12, wherein at least one of said first connector housing and said second connector housing includes an o-ring seal to prevent dust and debris ingress when said first and second connector housings are mated.

* * * * *